UNITED STATES PATENT OFFICE.

WALTER GLAESER, OF BROOKLYN, NEW YORK, ASSIGNOR, BY MESNE ASSIGNMENTS, TO POTASH EXTRACTION CORPORATION, OF NEW YORK, N. Y., A CORPORATION OF NEW YORK.

METHOD OF TREATING POTASSIUM-BEARING SILICATES.

1,323,464.

Specification of Letters Patent.

Patented Dec. 2, 1919.

No Drawing.

Application filed March 8, 1915. Serial No. 12,924.

*To all whom it may concern:*

Be it known that I, WALTER GLAESER, a subject of the German Emperor, and a resident of Brooklyn, county of Kings, State of New York, have invented a new and useful Improvement in Methods of Treating Potassium-Bearing Silicates, (Case 4,) of which the following is a specification, the principle of the invention being herein explained and the best mode in which I have contemplated applying that principle, so as to distinguish it from other inventions.

The present improvements relate in general to a method of treatment of potassium-bearing silicate for the purpose of securing the potassium in the form of a water soluble salt and in particular to a method of treating potassium-bearing silicates with a commercially inexpensive and abundant material to form not only a water soluble potassium salt, but also valuable by-products. To the accomplishment of this and related ends, said invention, then, consists of the means hereinafter fully described and particularly pointed out in the claims.

The following description sets forth in detail one approved method of carrying out the invention, such disclosed mode, however, constituting but one of the various ways in which the principle of the invention may be used.

The potassium-bearing silicate is first heated in lump form at a low red heat, such heat corresponding to about 800° C., and the heating being continued for a period of approximately two hours. The heated material is then chilled suddenly, preferably by treatment in water, and is then ground or crushed to the fineness of a 100-mesh screen.

The preliminary treatment of the silicate as described above is not in itself new and has been used before for the purpose of disintegrating the silicate and rendering it in a condition to be further crushed or treated. Obviously if the silicate undergoing treatment is already in a finely divided condition, or is in such a condition that it can be readily ground or crushed to a suitable fineness, then it will not be necessary to put the material through the preliminary treatment.

The powdered silicate is then intimately mixed with iron pyrites in the proportion of one hundred parts of the silicate to twenty parts of the pyrites. The mixture which is thus formed is preferably briqueted and dried, and is then heated in a suitable furnace in the presence of air and steam at a high temperature, in excess of 900° C. This heating when continued produces sulfurous acid which, in the presence of air and steam, is oxidized to sulfuric acid when in the presence of a contact substance, which in the present instance is the iron oxid produced during the heating from the pyrites. The unburned silicate also acts as a contact substance to produce the above reaction.

This heating is continued until the reaction has gone to completion, the products of the same being potassium sulfate which is water soluble and thus valuable as a fertilizer, and also sulfuric acid in small quantities. Pyrites usually contains various more or less valuable impurities, such for example as copper and the like, and these can be recovered at the close of the process.

If desired the powdered silicate may be mixed with a certain amount of lime or soda ash, as well as with iron pyrites if desirable, and it will sometimes be preferable to mix the silicate with pyrites and calcium sulfate. In case this latter mixture is made, it may be exposed to air and moisture until the pyrites has been oxidized to ferric sulfate. When the pyrites has been thus oxidized the mixture is heated in a suitable furnace as before, and in this instance there is produced potassium sulfate and sulfurous and sulfuric acids.

By this method of treatment the potassium-bearing silicate may be converted into usable salts and other valuable products also produced which increases the value of the products without greatly increasing the cost of the original material.

Other modes of applying the principle of my invention may be employed instead of the one explained, change being made as regards the process herein disclosed or the materials employed in carrying out the process, provided the step or steps stated by any of the following claims or the equivalent of such stated step or steps be employed.

I therefore particularly point out and distinctly claim as my invention:—

1. In a method of treating potassium bearing silicates, the steps which consist in heating the silicate at a low red heat, suddenly cooling the same, powdering the resulting material, mixing the same with powdered pyrites, and then burning such mixture in the presence of air and steam at a temperature in excess of 900° C.

2. In a method of treating potassium bearing silicates, the steps which consist in heating the silicate at a low red heat, suddenly cooling the same, powdering the resulting material, mixing the same with powdered pyrites in the proportions of 100 parts of silicate to 20 parts of pyrites, in the presence of air and steam and then burning the mixture in the presence of air and steam at a temperature in excess of 900° C.

3. In a method of treating potassium bearing silicates, the steps which consist in heating the silicate at a low red heat, suddenly cooling the same, powdering the resulting material, mixing the same with powdered pyrites in the proportions of 100 parts of silicate to 20 parts of pyrites, and then heating in the presence of air and steam at a temperature in excess of 900° C.

4. In a method of treating potassium bearing silicates, the steps which consist in heating the silicate at 800° C. for two hours, suddenly cooling the same in water, grinding the resulting material to pass an approximately 100 mesh screen, intimately mixing the same with powdered pyrites in the proportions of 100 parts of silicate to 20 parts of pyrites, and then burning the mixture in the presence of air and steam at a temperature in excess of 900° C.

5. In a method of treating potassium bearing silicates, the steps which consist in heating the silicate at a low red heat, suddenly cooling the same, intimately mixing the same with pyrites, exposing such mixture to air and moisture until the pyrites is oxidized to ferric sulfate and then burning the same at above 900° C. in the presence of air and steam.

6. In a method of treating potassium bearing silicates, the steps which consist in heating the silicate at a low red heat, suddenly cooling the same, intimately mixing the same with pyrites and calcium sulfate, briqueting the mixture and exposing the same to air and moisture until the pyrites is oxidized to ferric sulfate, and then burning the same at above 900° C. in the presence of air and steam.

Signed by me, this 16th day of February, 1915.

WALTER GLAESER.

Attested by—
J. J. DOYLE,
E. A. GANNON.